US011994093B2

(12) United States Patent
Hirao et al.

(10) Patent No.: US 11,994,093 B2
(45) Date of Patent: May 28, 2024

(54) ENGINE

(71) Applicant: Yanmar Holdings Co., Ltd., Osaka (JP)

(72) Inventors: Yu Hirao, Osaka (JP); Shinya Matsuo, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/119,261

(22) Filed: Mar. 8, 2023

(65) Prior Publication Data

US 2023/0287857 A1 Sep. 14, 2023

(30) Foreign Application Priority Data

Mar. 10, 2022 (JP) ................................ 2022-036987

(51) Int. Cl.
*F02M 63/02* (2006.01)
*F02M 55/02* (2006.01)
*F02M 59/44* (2006.01)

(52) U.S. Cl.
CPC ...... *F02M 63/0265* (2013.01); *F02M 55/025* (2013.01); *F02M 59/44* (2013.01)

(58) Field of Classification Search
CPC ... F02M 63/0265; F02M 55/025; F02M 59/44
USPC .......................................................... 123/456
See application file for complete search history.

(56) References Cited

FOREIGN PATENT DOCUMENTS

| | | | | | | |
|---|---|---|---|---|---|---|
| EP | 0892170 | A1 | * | 1/1999 | | F02M 63/0225 |
| EP | 3521611 | B1 | * | 7/2021 | | F02M 55/02 |
| JP | 11044222 | A | * | 2/1999 | | F02B 61/045 |
| JP | 2002-349385 | A | | 12/2002 | | |
| JP | 2003129946 | A | * | 5/2003 | | |

OTHER PUBLICATIONS

JP2003129946A (Yukihiro et al. ) (May 8, 2003) (Machine Translation) (Year: 2003).*

* cited by examiner

*Primary Examiner* — Mahmoud Gimie
(74) *Attorney, Agent, or Firm* — NORTON ROSE FULBRIGHT US LLP

(57) ABSTRACT

[Problem] To provide, in an engine provided with two cylinder rows, a technology that, while suppressing a cost increase, can suppress a difference in combustion performance between the cylinder rows.
[Solution] An exemplary engine includes: a first cylinder row having plural cylinders arranged in a front and rear direction; a second cylinder row arranged parallel to the first cylinder row; plural first injectors provided for the respective cylinders of the first cylinder row, plural second injectors provided for respective cylinders of the second cylinder row; and a fuel pump having a first discharge port to discharge a fuel to the plural first injectors and a second discharge port to discharge a fuel to the plural second injectors. The fuel pump is placed between the first cylinder row and the second cylinder row in a plan view from an up and down direction.

20 Claims, 6 Drawing Sheets

ENGINE

CROSS-REFERENCE TO RELATED APPLICATIONS

This application claims priority under 35 U.S.C. § 119 to JP Application No. 2022-036987 filed Mar. 10, 2022, the entire contents of which are hereby incorporated by reference.

TECHNICAL FIELD

The present invention relates to an engine.

BACKGROUND ART

Conventionally, there is known a V-type engine which includes, between banks, two delivery tubes derived out of a high-pressure fuel pump, and in which fuel is distributed by sequentially connecting injectors of each of the banks by means of one of delivery tubes (see, for example, Patent Document 1).

PRIOR ART DOCUMENT

Patent Document

Patent Document 1: Japanese Unexamined Patent Application Publication No. 2002-349385

SUMMARY OF INVENTION

Technical Problem

In the V-type engine disclosed in Patent Document 1, the high-pressure fuel pump is placed on the rear side of one bank (behind the bank). In this configuration, the high-pressure fuel pump is placed unevenly at the end of the one bank, thus causing a concern that a difference in length of the fuel pipes that supply the fuel from the high-pressure fuel pump to the injectors may occur between the two banks. The difference in length of the fuel pipes may cause, due to fuel pulsation, a difference in fuel injection volume and fuel injection pressure, which may lead to a difference in combustion performance between the banks. To avoid this, it is conceivable to equalize the length of fuel pipes between the two banks, but this would require matching the length to the longer fuel pipe, which may cause a drop in fuel injection pressure due to increased flow resistance due to an extended flow path, resulting in deteriorated engine performance, and may also be uneconomical in terms of cost.

It is an object of the present invention to provide, in an engine provided with two cylinder rows, a technology that, while suppressing a cost increase, can suppress a difference in combustion performance between the cylinder rows.

Solution to Problem

An exemplary engine according to the present invention includes: a first cylinder row having plural cylinders arranged in a front and rear direction; a second cylinder row arranged parallel to the first cylinder row; plural first injectors provided for the respective cylinders of the first cylinder row, plural second injectors provided for respective cylinders of the second cylinder row; and a fuel pump having a first discharge port to discharge a fuel to the plural first injectors and a second discharge port to discharge a fuel to the plural second injectors. The fuel pump is placed between the first cylinder row and the second cylinder row in a plan view from an up and down direction.

Advantageous Effects of Invention

In an engine provided with two cylinder rows, the exemplary present invention, while suppressing a cost increase, can suppress a difference in combustion performance between the cylinder rows. The exemplary present invention can suppress a difference from occurring to combustion performance between the cylinder rows, making it possible to suppress engine performance from deteriorating.

DESCRIPTION OF EMBODIMENTS

Figure 1:
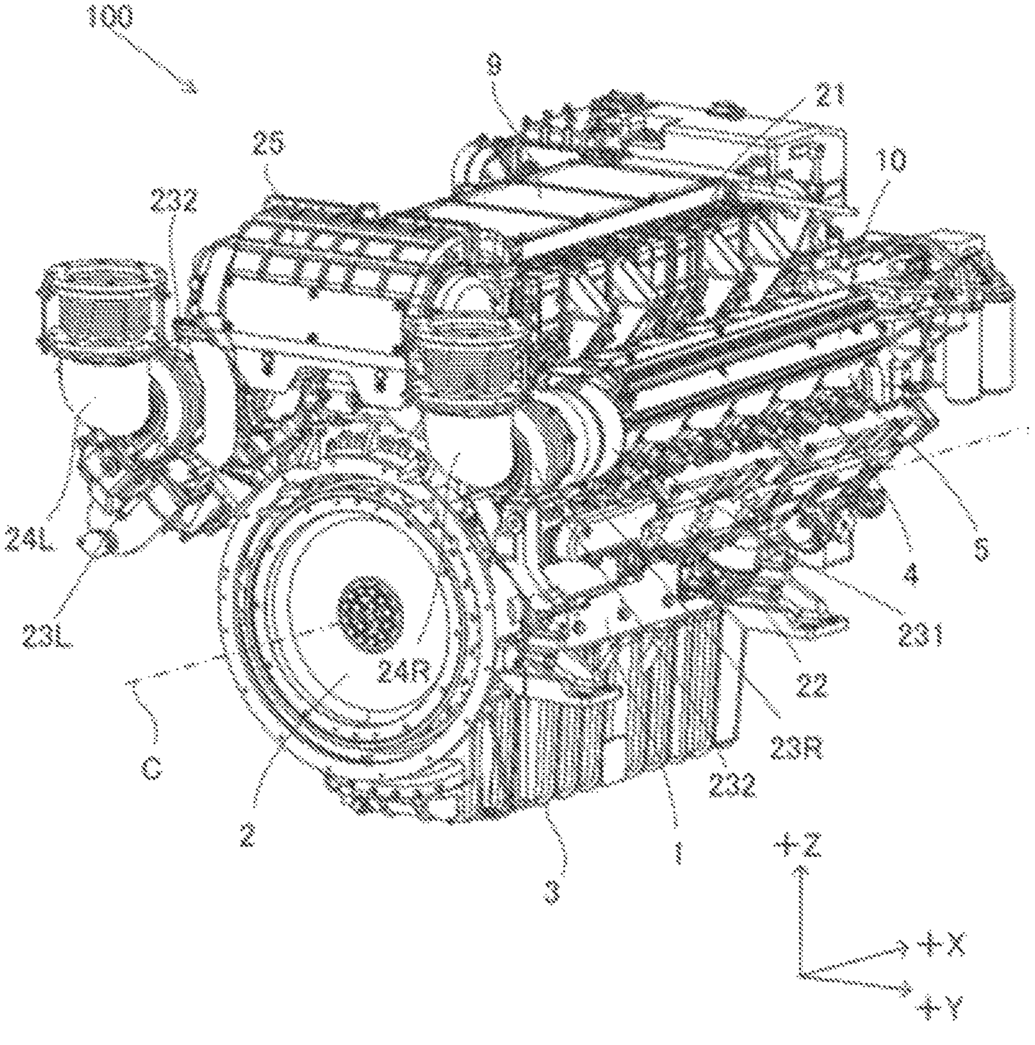
FIG. 1 is a schematic perspective view showing a configuration of an engine.

The following is a detailed description of an exemplary embodiment of the present invention with reference to the drawings. In the drawings, XYZ coordinate system is shown as the 3D Cartesian coordinate system, as appropriate. In the following description, X direction is defined as a front and back direction, Y direction is defined as a right and left direction, and Z direction is defined as an up and down direction. +X side is defined as a front side, and −X side is defined as a back side. +Y side is defined as a right side, and −Y side is defined as the left side. +Z side is defined as an upper side, and −Z side is defined as a lower side. In detail, the direction in which a center line C of a crankshaft (output shaft) shown in FIG. 1 extends is defined as the front and back direction, and the side where a flywheel 2 is placed relative to a cylinder block 1 is defined as the back side. The up and down direction is defined with the side, where an oil pan 3 is placed relative to the cylinder block 1, as the lower side. The direction orthogonal to the front and back and up and down directions is defined as the right and left direction, with the right side being the right side and the left side being the left side when viewed from the back toward the front. These directions are names merely used for an illustrative purpose, and are not intended to limit the actual positional relation and direction.

1. OVERVIEW OF ENGINE

FIG. 1 is a schematic perspective view showing a configuration of an engine 100 according to an embodiment of the present invention. The engine 100 is preferable, for example, as a marine engine used for a ship. However, the engine 100 is not limited to the marine engine, and may be applied to any other application. The engine 100 is a diesel engine.

Figure 2:
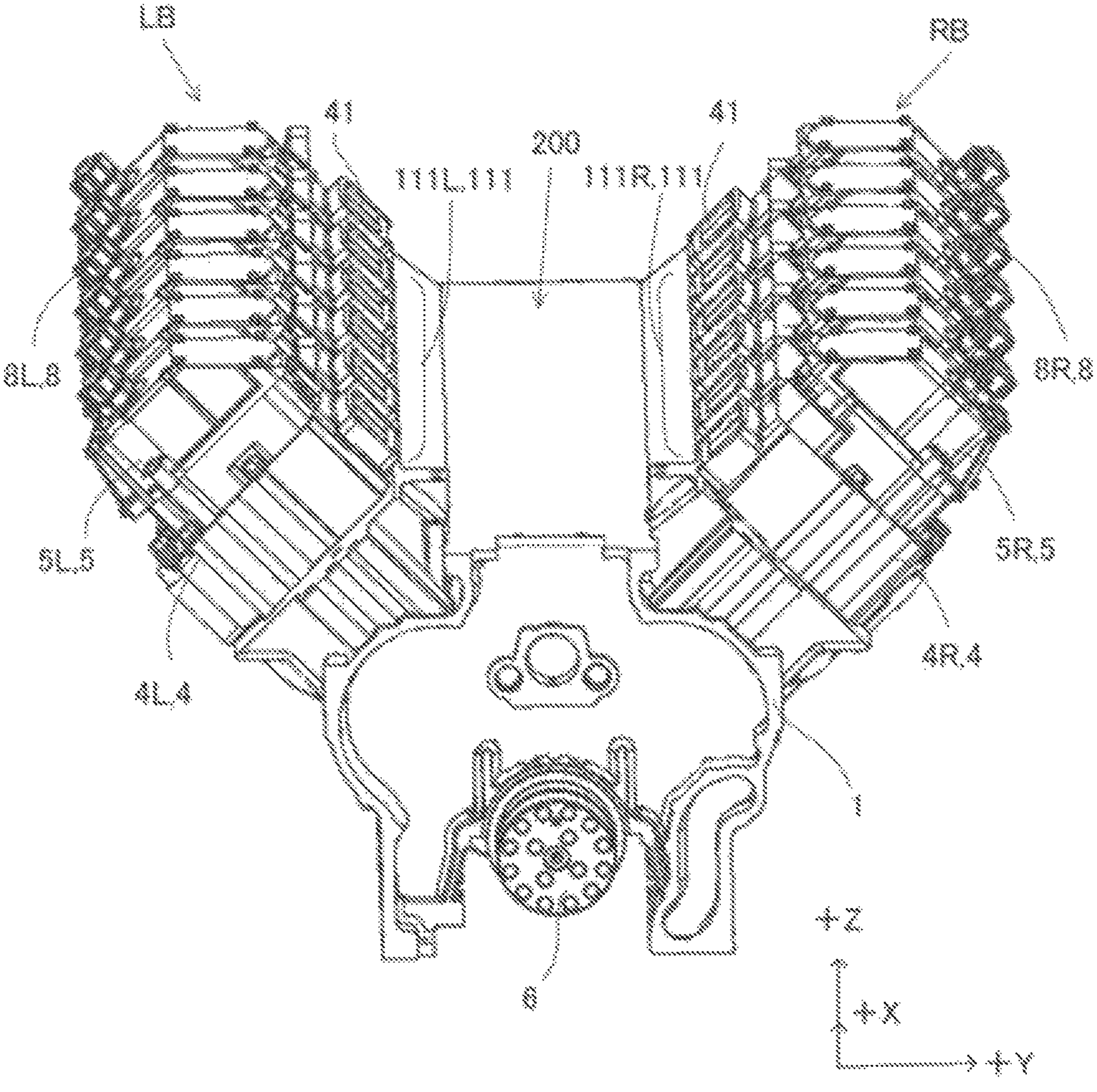
FIG. 2 is a schematic perspective view extracting and showing a portion including a cylinder block, a head block, and a head cover which are provided in the engine.
Figure 3:
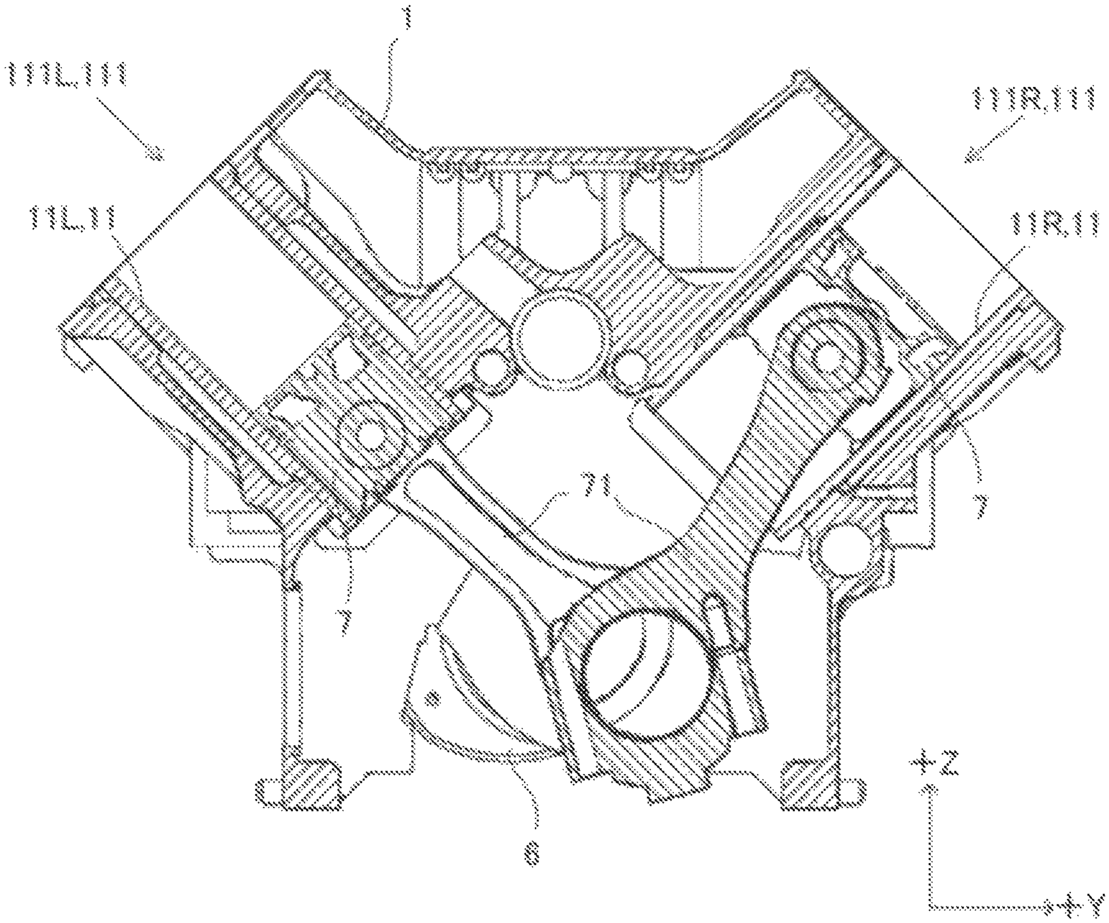
FIG. 3 is a schematic cross-sectional view of a cylinder block portion provided in the engine.

As shown in FIG. 1, the engine 100 includes a cylinder block 1, a head block 4, and a head cover 5. FIG. 2 is a schematic perspective view extracting and showing a portion including the cylinder block 1, the head block 4, and the head cover 5 which are provided in the engine 100. FIG. 3 shows a schematic cross-sectional view of the cylinder block 1 portion of the engine 100.

As shown in FIGS. 2 and 3, a crankshaft 6 and a piston 7 which extend in the front and back direction are placed inside the cylinder block 1. The interior of the cylinder block 1 connects to the interior of the oil pan 3 which is placed at the lower side and stores a lubricant oil. A flywheel 2 (see FIG. 1) is mounted to the back end of the crankshaft 6. The flywheel 2 rotates integrally with the crankshaft 6, and is used to take out power from the engine 100. The piston 7, in detail, is placed in the cylinder 11 formed in the cylinder block 1. The piston 7 is connected to the crankshaft 6 via a connecting rod 71.

In detail, the cylinder block 1 has a right cylinder 11R placed on the right side and a left cylinder 11L placed on the left side. The right cylinder 11R, when viewed from behind, is of a cylindrical shape which is tilted to the right relative to the up and down direction and extends in an oblique direction. The left cylinder 11L, when viewed from behind, is of a cylindrical shape which is tilted to the left relative to the up and down direction and extends in an oblique direction. The right cylinder 11R and the left cylinder 11L are placed in a V-shape. The pairwise right cylinder 11R and left cylinder 11L which are placed in the V-shape are placed with their cylinder axes slightly offset in the front and back direction. In the present embodiment, the left cylinder 11L is placed slightly forward of the right cylinder 11R.

The cylinder block 1 has two cylinder rows 111. In detail, the cylinder block 1 has a right cylinder row 111R with the plural right cylinders 11R arranged in the front and back direction, and a left cylinder row 111L with the plural left cylinders 11L arranged in the front and back direction. The right cylinder row 111R and the left cylinder row 111L are the same in the number of cylinders 11. That is, the engine 100 has a first cylinder row 111R with of the plural right cylinders 11R arranged in the front and back direction. The engine 100 has a second cylinder row 111L arranged parallel to the first cylinder row 111R. The second cylinder row 111L together with the first cylinder row 111R is arranged in the right and left direction, and has the left cylinders 11L that are same in number as the right cylinders 11R and that are arranged in the front and back direction. The right cylinder row 111R and the left cylinder row 111L form a V-shaped bank. In the present embodiment, the number of right cylinders 11R included in the right cylinder row 111R and the number of left cylinders 11L included in the left cylinder row 111L are each six, as an example. That is, the engine 100 in the present embodiment is a V-type 12-cylinder engine.

In each of the right and left cylinder rows 111R and 111L, the head block 4 is placed overlapping each cylinder 11. The head block 4 is fastened to the cylinder block 1 by using a screw. In detail, the head block 4 includes a right head block 4R that overlaps the right cylinder 11R and a left head block 4L that overlaps the left cylinder 11L. Because one right head block 4R overlaps each right cylinder 11R, there are as many right head blocks 4R as there are right cylinders 11R. Because one left head block 4L is overlaps each left cylinder 11L, there are as many left head blocks 4L as there are left cylinders 11L. In the present embodiment, the number of right head blocks 4R and the number of left head blocks 4L are each six.

Each of the head blocks 4 has an intake port 41 to supply gas to a combustion chamber including the cylinder 11, the piston 7, and the head block 4, and an exhaust port (not shown) to exhaust the gas from the combustion chamber. The exhaust port is provided on the opposite face of the face where the intake port 41 is provided. In detail, the right head block 4R has the intake port 41 on the left lateral face and the exhaust port on the right lateral face. The left head block 4L has the intake port 41 on the right lateral face and the exhaust port on the left lateral face.

Each head block 4 is covered with the head cover 5. The head cover 5 is fastened to head block 4 by using a screw. Each head cover 5 covers intake and exhaust valves (not shown) placed at the head block 4. An injector 8 is mounted on each head cover 5. The injector 8's one end portion, where an injection port for injecting a fuel is placed, faces the combustion chamber. The injector 8's another end portion projects outward from the head cover 5.

In detail, the head cover 5 includes a right head cover 5R that covers the right head block 4R and a left head cover 5L that covers the left head block 4L. The right head covers 5R, due to covering the respective right head blocks 4R, are the same in number as the right head blocks 4R. The left head covers 5L, due to covering the respective left head blocks 4L, are the same in number as the left head blocks 4L. In the present embodiment, the number of right head cover 5R and left head cover 5L are each six. Also, the number of right injectors 8R placed at the right head cover 5R and the number of left injectors 8L placed at the left head cover 5L are each six.

As can be seen from the above, the engine 100 is provided with the plural first injectors (right injectors) 8R provided for the respective cylinders (right cylinders) 11R of the first cylinder row (right cylinder row) 111R and the plural second injectors (left injectors) 8L provided for the respective cylinders (left cylinders) 11L of the second cylinder row (left cylinder row) 111L. The engine 100 has the plural first injectors 8R and the plural second injectors 8L, and the first injectors 8R and the second injectors 8L are the same in number. The first injector 8R and the second injector 8L are the same. Further, in the present embodiment, the first injector 8R and the second injector 8L are the same, but may be different.

On the right side of cylinder block 1, the right cylinder 11R, the right head block 4R and the right head cover 5R, which are included in a right bank RB, extend diagonally upward to the right. On the left side of cylinder block 1, the left cylinder 11L, the left head block 4L, and the left head cover 5L, which are included in a left bank LB, extend diagonally upward to the left. In plan view from the front and back direction, a combination of the right bank RB and the left bank LB is V-shaped, and the engine 100 has a V-bank. An intra-bank area 200 is formed between the right bank RB and the left bank LB in the right and left direction.

Returning to FIG. 1, the engine 100 has an upper face cover 9 and a lateral face cover 10. The upper face cover 9 prevents water from splashing, due to condensation, for example, onto a controller 26 (see FIG. 4, etc., below) and the like placed inside. The lateral face cover 10 prevents the fuel from splashing due to a crack, etc. in a component part such as the head block 4, for example. Although FIG. 1 shows only the lateral face cover 10 placed on the right lateral face, a similar lateral face cover 10 is also placed on the left lateral face. That is, the engine 100 is equipped with a pair of right and left lateral face covers 10.

Figure 4:
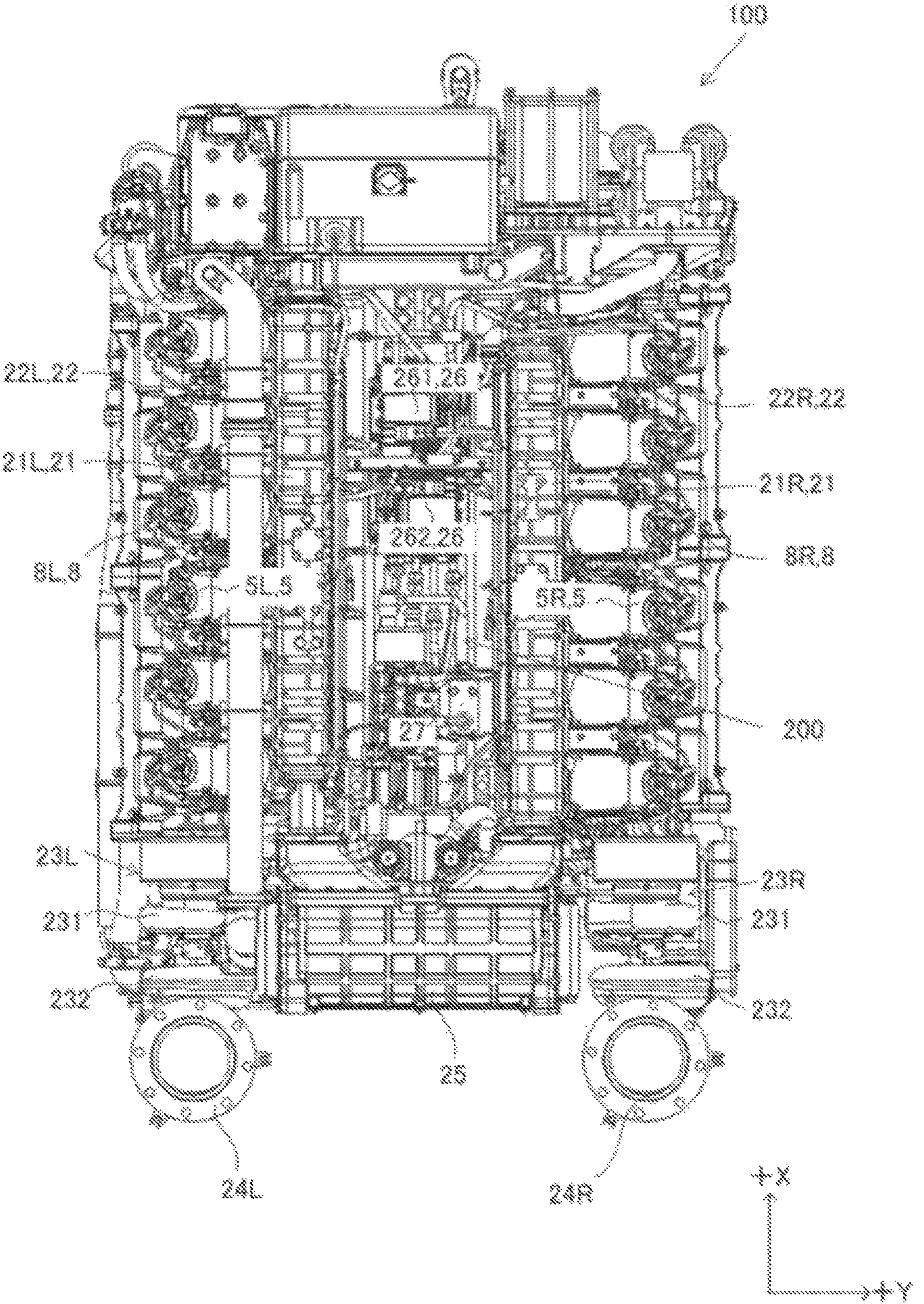
FIG. 4 is a schematic top view showing the configuration of the engine.

FIG. 4 is a schematic top view showing the configuration of the engine 100 according to the embodiment of the present invention. In FIG. 4, the upper face cover 9 and the pair of lateral face cover are omitted. As shown in FIGS. 1 and 4, the engine 100 includes an intake manifold 21 and an exhaust manifold 22.

To each of the cylinders 11, the intake manifold 21 distributes intake air which is air or mixture air taken in from the outside. The intake manifold 21 is placed at an upper portion of the engine 100, and extends in the front and back direction. In detail, the intake manifold 21 includes a right intake manifold 21R for the right cylinder 11R, and a left intake manifold 21L for the left cylinder 11L.

The right intake manifold 21R is placed above the respective intake ports 41 (see FIG. 2) of the plural right head blocks 4R which are arranged in the front and back direction. The interior of the right intake manifold 21R and the respective right cylinders 11R are connected via the respective intake ports 41. The left intake manifold 21L is placed above the respective intake ports 41 of the plural left head blocks 4L which are arranged in the front and back direction. The interior of the left intake manifold 21L and the respective left cylinders 11L are connected via the respective intake ports 41.

In detail, an intake valve (not shown) is interposed between each intake port 41 and each cylinder 11; when the intake valve is open, the inside of intake manifold 21 and cylinder 11 are communicated.

The exhaust manifold 22 collects the exhaust air from the respective cylinders 11. The exhaust manifold 22 is placed at the lateral face portion of the engine 100, and extends in the front and back direction. In detail, the exhaust manifold 22 includes a right exhaust manifold 22R for the right cylinder 11R, and a left exhaust manifold 22L for the left cylinder 11L.

The right exhaust manifold 22R is placed on the right side of the plural right head blocks 4R (see FIG. 2) which are arranged in the front and back direction. The inside of the right exhaust manifold 22R and the respective right cylinders 11R are connected via exhaust ports (not shown) provided on the right side of the right head blocks 4R. The left exhaust manifold 22L is placed on the left side of the plural left head blocks 4L (see FIG. 2) which are arranged in the front and back direction. The inside of the left exhaust manifold 22L and the respective left cylinders 11L are connected via the exhaust ports (not shown) provided on the left side of the left head blocks 4L.

In detail, an exhaust valve (not shown) is interposed between each exhaust port and each cylinder 11; when the exhaust valve is open, the inside of the exhaust manifold 22 and the cylinder 11 are communicated.

The exhaust gas collected at the right exhaust manifold 22R is exhausted to the outside via the right turbocharger 23R and the right exhaust outlet pipe 24R which are each placed at the right back of the engine 100. The exhaust gas collected at the left exhaust manifold 22L is exhausted to the outside via the left turbocharger 23L and the left exhaust outlet pipe 24L which are each placed at the left back of the engine 100.

The right turbocharger 23R and the left turbocharger 23L each have a compressor unit 231 and a turbine unit 232. The compressor unit 231 pressurizes and compresses intake air such as air supplied from outside the engine 100. The pressurized and compressed intake air is supplied via an intercooler 25 to the intake manifold 21. The turbine unit 232 is rotated by the exhaust gas supplied from the exhaust manifold 22. The rotary power of the turbine unit 232 is transmitted to the compressor unit 231. That is, the right turbocharger 23R and left turbocharger 23L in the present embodiment are so-called turbochargers that are driven by an exhaust gas turbine.

The intercooler 25, which is connected with the intake manifold 21, is supplied with cooling water by a cooling water pump (not shown), thereby to cool the intake air. The intake air supplied from the compressor unit 231 is pressurized and compressed, thereby to generate a compression heat and to be increased in temperature.

The intercooler 25 performs heat exchange between the cooling water, which is supplied by the cooling water pump, and the pressurized compressed intake air, thereby to cool the intake air. That is, providing the intercooler 25 allows the temperature of the intake air, which is supplied to the intake manifold 21, to be adjusted to a desired temperature.

As shown in FIG. 4, the right intake manifold 21R and the left intake manifold 21L are spaced apart and arranged in the right and left direction at the upper portion of the engine 100. As shown in FIG. 4, with the upper face cover 9 removed, the intra-bank area 200 is exposed to the outside via a space between the right intake manifold 21R and the left intake manifold 21L. In the intra-bank area 200, there is placed, for example, the controller 26 which controls the entire engine 100.

That is, the engine 100 includes the controller 26 placed in the intra-bank area 200 positioned between the first and second cylinder rows 111R and 111L. The intra-bank area 200 may be, in a strict sense, a space area between the first and second cylinder rows 111R and 111L. However, in the present embodiment, the intra-bank area 200 widely includes the space area in the right and left direction between the right bank RB which includes the first cylinder row 111R, and the left bank LB which includes the second cylinder row 111L.

Creating the configuration to place the controller 26 in the intra-bank area 200 can efficiently use the intra-bank area 200 for placing the component part. This makes it possible to downsize the engine 100. However, the controller 26 may be placed outside of the intra-bank area 200.

Further, the controller 26 includes, in detail, a first controller 261 and a second controller 262. However, the number of controllers 26 may be changed as needed; for example, the controller 26 may include only one controller. In the present embodiment, the first controller 261 and the second controller 262 are arranged in the front and back direction. In detail, the first controller 261 is placed forward of the second controller 262. One of the first controller 261 and the second controller 262 is a main controller and another thereof is a sub-controller. In the present embodiment, the first controller 261 is the main controller, and the second controller 262 is the sub-controller.

The first controller 261 configured as the main controller executes a calculation necessary to control the engine 100. The calculations required to control the engine 100 include, for example, a calculation related to the control of fuel injection and a calculation related to stopping the engine 100. The second controller 262 which is configured as the sub-controller is connected with the first controller 261 by a communication line (not shown), and is so provided as to be capable of communicating with the first controller 261. The second controller 262 executes a control operation according to an instruction from the first controller 261.

The first controller 261 controls the right injector 8R placed at the right bank RB. That is, the first controller 261 and each right injector 8R are electrically connected. Further, the second controller 262 controls the left injector 8L placed at the left bank LB. That is, the second controller 262 and each left injector 8L are electrically connected.

2. FUEL SYSTEM

Figure 5:
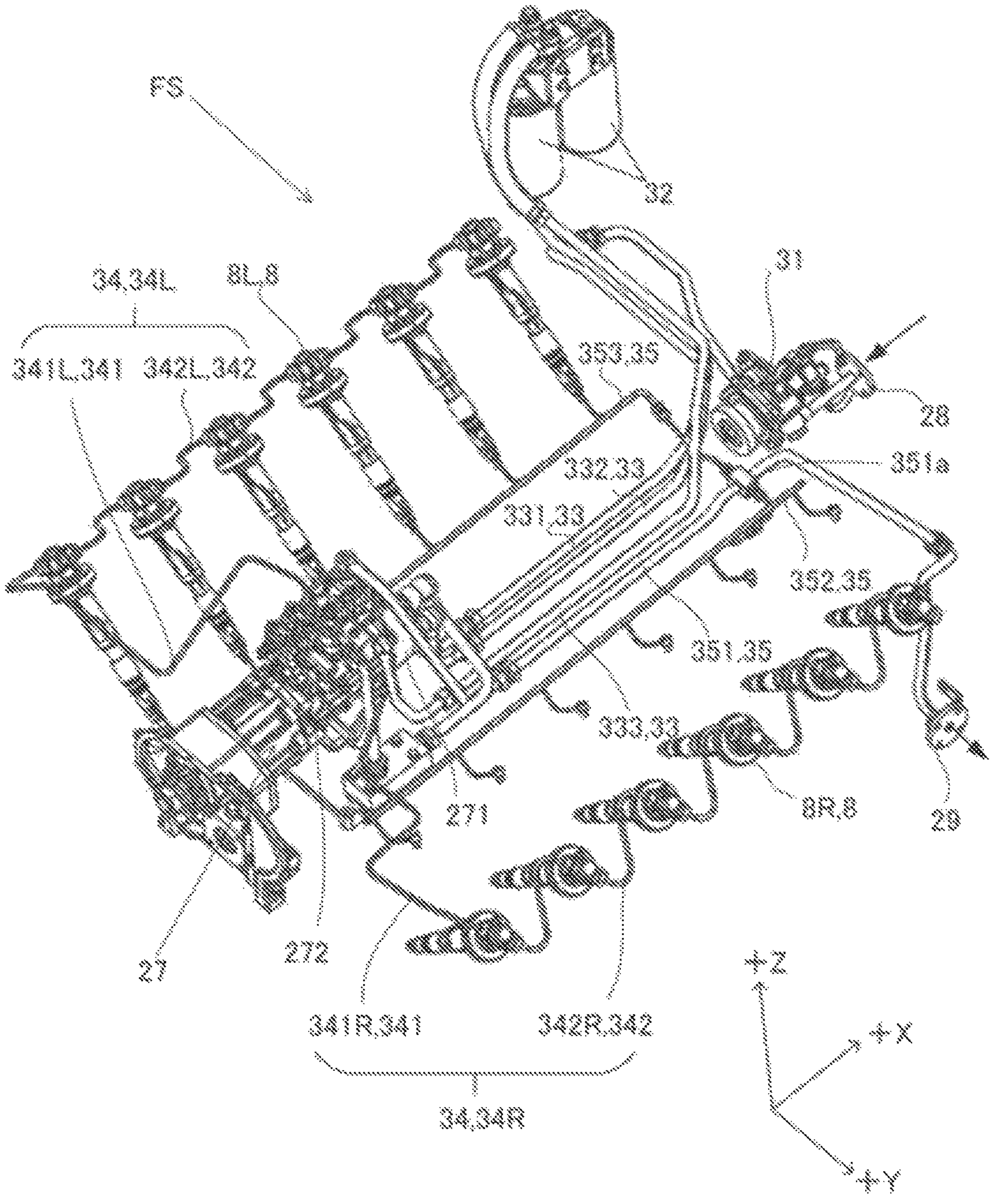
FIG. 5 is a schematic perspective view extracting and showing a fuel system provided in the engine.

As shown in FIG. 4, the engine 100 is provided with a fuel pump 27. The fuel pump 27 supplies fuel to the injector 8. Hereinafter, the fuel system that includes the fuel pump 27 is to be described in detail. FIG. 5 is a schematic perspective view extracting and showing a fuel system FS provided in the engine 100. In FIG. 5, the fuel tanked in a fuel tank (not shown) is supplied from a fuel inlet portion 28 to the engine 100. Further, part of the fuel is returned from the engine 100 through a fuel outlet portion 29 to the fuel tank.

As shown in FIG. 5, the fuel system FS is provided, other than the above injector 8 and the above fuel pump 27, with an auxiliary pump 31, a fuel filter 32, a low-pressure fuel supply pipe 33, a high-pressure fuel supply pipe 34, and a fuel return pipe 35. As described above, the injectors 8 include six right injectors 8R and six left injectors 8L. The fuel pump 27 is driven by using a rotary power of the crankshaft 6. The auxiliary pump 31 assists in pumping the fuel at the time of starting the engine 100. The fuel pumps 27 include, in detail, a low-pressure fuel pump 271 and a high-pressure fuel pump 272.

The low-pressure fuel supply pipes 33 include a first low-pressure fuel supply pipe 331, a second low-pressure fuel supply pipe 332, and a third low-pressure fuel supply pipe 333. The first low-pressure fuel supply pipe 331 connects the fuel inlet portion 28 with the low-pressure fuel pump 271 via the auxiliary pump 31. The second low-pressure fuel supply pipe 332 connects the low-pressure fuel pump 271 with the fuel filter 32. The third low-pressure fuel supply pipe 333 connects the fuel filter 32 with the high-pressure fuel pump 272.

In the present embodiment, the fuel filter 32 is so configured as to include two fuel filters placed in parallel, but this is an exemplification. The number of fuel filters may be properly modified, and may be one, three or more. Further, the configuration may be such that plural fuel filters are connected in series.

The high-pressure fuel supply pipes 34 include a right high-pressure fuel supply pipe 34R and a left high-pressure fuel supply pipe 34L. The right high-pressure fuel supply pipe 34R is a fuel pipe for the right bank RB, and connects the high-pressure fuel pump 272 with the plural (six in the present embodiment) right injectors 8R. The left high-pressure fuel supply pipe 34L is a fuel pipe for the left bank LB, and connects the high-pressure fuel pump 272 with the plural (six in the present embodiment) left injectors 8L. Further, it is preferable that the right high-pressure fuel supply pipe 34R and the left high-pressure fuel supply pipe 34L should be the same in length. This suppresses the right injector 8R and the left injector 8L from having a shift in injection timing.

The fuel return pipes 35 include a first fuel return pipe 351, a second fuel return pipe 352, and a third fuel return pipe 353. The first fuel return pipe 351 connects the high-pressure fuel pump 272 with the fuel outlet portion 29. The second fuel return pipe 352 is a fuel pipe for the right bank RB, and is connected with each of the right head blocks 4R included in the right bank RB. Further, the second fuel return pipe 352 is connected to a merge portion 351*a* provided in the middle of the first fuel return pipe 351. At the merge portion 351*a*, the fuel flowing through the second fuel return pipe 352 merges with the fuel flowing through the first fuel return pipe 351. The third fuel return pipe 353 is a fuel pipe for the left bank LB, and is connected with each of the left head blocks 4L included in the left bank LB. Further, the third fuel return pipe 353 is connected to the merge portion 351*a* provided in the middle of the first fuel return pipe 351. At the merge portion 351*a*, the fuel flowing through the third fuel return pipe 353 merges with the fuel flowing through the first fuel return pipe 351.

According to an operation of the low-pressure fuel pump 271, the fuel supplied to the fuel inlet portion 28 enters the low-pressure fuel pump 271 through inside the first low-pressure fuel supply pipe 331, is pressurized, and is then sent through inside the second low-pressure fuel supply pipe 332 to the fuel filter 32. Any debris and dirt of the fuel sent to the fuel filter 32 are removed by the fuel filter 32. The fuel from which debris and the like have been removed is sent through inside the third low-pressure fuel supply pipe 333 to the high-pressure fuel pump 272.

The high-pressure fuel pump 272, which is fed with the fuel, discharges the fuel, at a high pressure, toward the right high-pressure fuel supply pipe 34R and the left high-pressure fuel supply pipe 34L. The fuel passing through the right high-pressure fuel supply pipe 34R is distributed to each of the right injectors 8R placed at the right bank RB. The fuel passing through the left high-pressure fuel supply pipe 34L is distributed to each of the left injectors 8L placed at the left bank LB. Each of the injectors 8 injects the fuel to the combustion chamber at a given timing.

Further, the high-pressure fuel pump 272 returns any excess fuel via the first fuel return pipe 351 to the fuel tank. Further, the excess fuel not having been used for combustion is flowed from each of the right head blocks 4R to the second fuel return pipe 352. Further, the excess fuel not having been used for combustion is flowed from each of the left head blocks 4L to the third fuel return pipe 353. The fuels returned to the second fuel return pipe 352 and the third fuel return pipe 353, by the merge portion 351*a*, are merged with the fuel of the first fuel return pipe 351, and are returned to the fuel tank.

Figure 6:
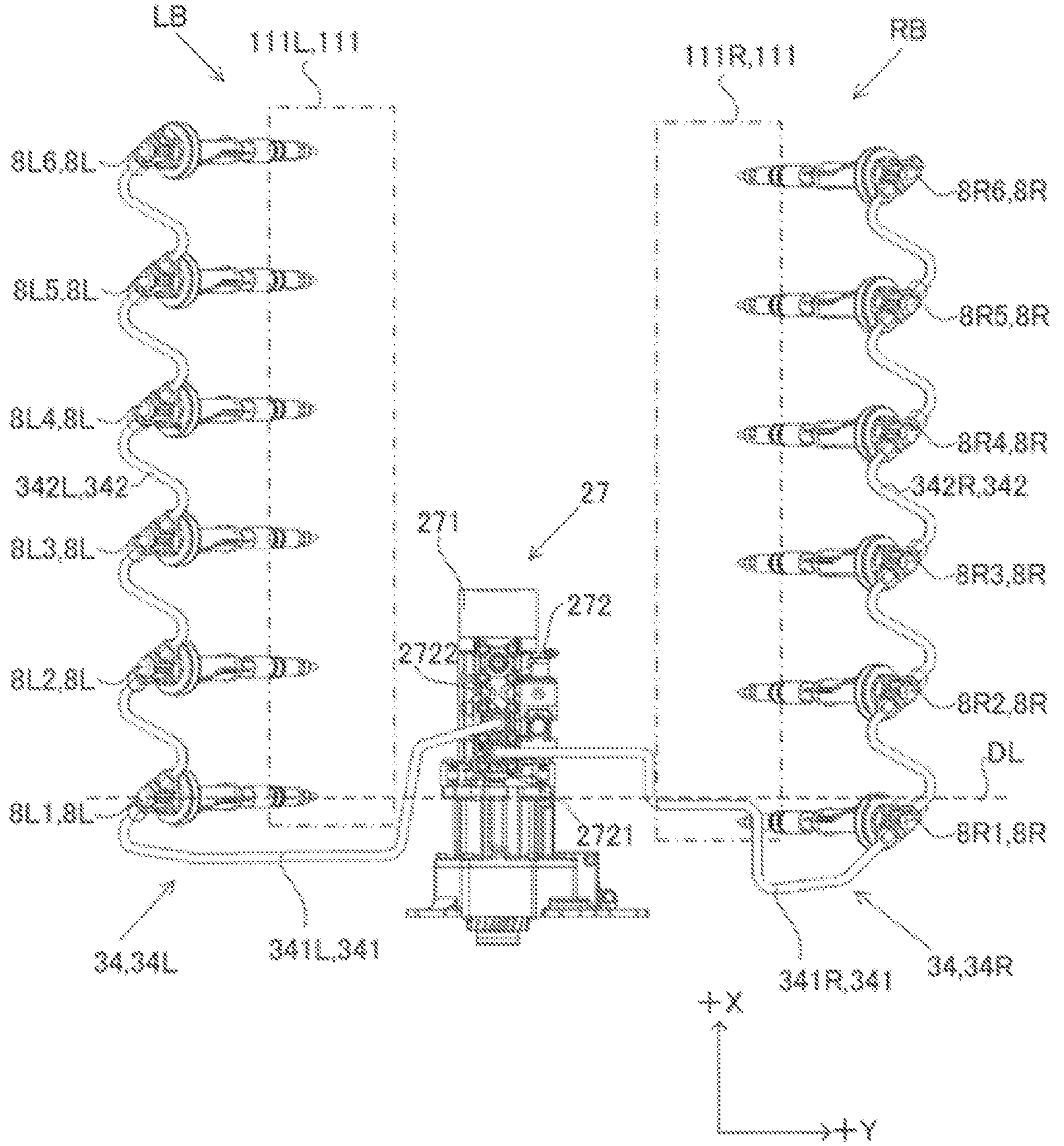
FIG. 6 is a diagram extracting and showing part that is of the fuel system provided in the engine, and that is related to a fuel pump and an injector.

FIG. 6 is a diagram extracting and showing part that is of the fuel system FS provided in the engine 100, and that is related to the high-pressure fuel pump 272 and the injector 8. In FIG. 6, the single-dotted frame schematically shows an area where the right and left cylinder rows 111 are placed. As shown in FIG. 6, the fuel pump 27 has a first discharge port 2721 and a second discharge port 2722. In detail, the high-pressure fuel pump 272 has the first discharge port 2721 and the second discharge port 2722. The high-pressure fuel pump 272 has two fuel discharge ports.

The first discharge port 2721 discharges the fuel to the plural first injectors. The second discharge port 2722 discharges the fuel to the plural second injectors. In detail, the first discharge port 2721 discharges the fuel to the six right injectors 8R. The second discharge port 2722 discharges the fuel to the six left injectors 8L.

The fuel discharged from the first discharge port 2721 to the plural first injectors arranged in the front and back direction is sequentially supplied to the plural first injectors, from the first injector positioned at one end in the front and back direction to the first injector positioned at the other end, according to a sequence of arrangement of the plural first injectors in the front and back direction. In the present embodiment, the fuel discharged from the first discharge port 2721 to the six right injectors 8R arranged in the front and back direction is sequentially supplied, from the right injector 8R positioned at the rear end to the right injector 8R positioned at the front end, according to a sequence of arrangement of the injectors in the front and back direction.

In FIG. 6, the fuel discharged from the first discharge port 2721 flows to a first right injector 8R1, a second right injector 8R2, a third right injector 8R3, a fourth right injector 8R4, a fifth right injector 8R5, and a sixth right injector 8R6 in that order. Further, the first right injector 8R1 is the right injector 8R positioned at the rear end. The second right injector 8R2 is the right injector 8R positioned one ahead of the first right injector 8R1. The third right injector 8R3 is the right injector 8R positioned one ahead of the second right injector 8R2. The fourth right injector 8R4 is the right injector 8R positioned one ahead of the third right injector 8R3. The fifth right injector 8R5 is the right injector 8R positioned one ahead of the fourth right injector 8R4. The sixth right injector 8R6 is the right injector 8R positioned one ahead of the fifth right injector 8R5.

Further, the fuel discharged from the second discharge port 2722 to the plural second injectors arranged in the front and back direction is sequentially supplied to the plural second injectors, from the second injector positioned at one end in the front and back direction to the second injector positioned at the other end, according to a sequence of arrangement of the plural second injectors in the front and back direction. In the present embodiment, the fuel discharged from the second discharge port 2722 to the six left injectors 8L arranged in the front and back direction is sequentially supplied, from the left injector 8L positioned at the rear end to the left injector 8L positioned at the front end, according to a sequence of arrangement of the injectors in the front and back direction.

In FIG. 6, the fuel discharged from the second discharge port 2722 flows to a first left injector 8L1, a second left injector 8L2, a third left injector 8L3, a fourth left injector 8L4, a fifth left injector 8L5, and a sixth left injector 8L6 in that order. Further, the first left injector 8L1 is the left injector 8L positioned at the rear end. The second left injector 8L2 is the left injector 8L positioned one in front of the first left injector 8L1. The third left injector 8L3 is the left injector 8L positioned one ahead of the second left injector 8L2. The fourth left injector 8L4 is the left injector 8L positioned one ahead of the third left injector 8L3. The fifth left injector 8L5 is the left injector 8L positioned one ahead of the fourth left injector 8L4. The sixth left injector 8L6 is the left injector 8L positioned one ahead of the fifth left injector 8L5.

Not limited to the configuration of the present embodiment, it may be so configured as to store, in a common rail, the high-pressure fuel pumped from the high-pressure fuel pump 272 and to distribute the high-pressure fuel in the common rail to each of the injectors.

As shown in FIG. 6, the fuel pump 27 is placed between the first cylinder row 111R (right cylinder row) and the second cylinder row 111L (left cylinder row) in plan view from the up and down direction. The space between the first and second cylinder rows 111R and 111L may be otherwise read as between the right bank RB and the left bank LB. With this configuration, the first and second discharge ports 2721 and 2722 can be placed in the center portion of the two cylinder rows 111R, 111L (two banks RB, LB) in the right and left direction. As a result, the two high-pressure fuel supply pipes 34R and 34L, which supply the fuel from the fuel pump 27 to the injectors 8 of the respective cylinder rows 111R and 111L, can be the same in length with each other, while preventing the length from being longer than necessary.

In the present embodiment, the fuel pump 27 having the first and second discharge ports 2721 and 2722 is so configured as to have the low-pressure fuel pump 271 and the high-pressure fuel pump 272, but this is merely an exemplification. The fuel pump having the first and second discharge ports may be a stand-alone high-pressure fuel pump.

In the present embodiment, the first and second discharge ports 2721 and 2722 are placed between the right and left cylinder rows 111R and 111L, in plan view from the up and down direction. In detail, the first and second discharge ports 2721 and 2722 are placed in the center portion of the right and left cylinder rows 111R and 111L, in plan view from the up and down direction. The center portion may include not only a position that is completely in the midst, but also a position that deviates somewhat from the midst.

In the present embodiment, the first and second discharge ports 2721 and 2722 are placed near one end portion of the V bank, which includes the right bank RB and left bank LB, in the front and back direction. In detail, the first and second discharge ports 2721 and 2722 are placed near the rear end of the V-bank in the front and back direction. With the above placement, the first discharge port 2721 can be placed near the first right injector 8R1 that is first supplied with the fuel in the right bank RB, and the second discharge port 2722 can be placed near the first left injector 8L1 that is first supplied with the fuel in the left bank LB. As a result, the length of the high-pressure fuel supply pipe 34 can be suppressed from becoming longer than necessary.

As shown in FIG. 6, the high-pressure fuel supply pipe 34 includes a connecting pipe 341 and a plurality of inter-injector pipes 342. The connecting pipes 341 include a right connecting pipe 341R and a left connecting pipe 341L. The inter-injector pipes 342 include a right inter-injector pipe 342R and a left inter-injector pipe 342L. The right high-pressure fuel supply pipe 34R includes the right connecting pipe 341R and a plurality of right inter-injector pipes 342R. The left high-pressure fuel supply pipe 34L includes the left connecting pipe 341L and a plurality of left inter-injector pipes 342L.

In detail, the right connecting pipe 341R, for enabling fuel supply, connects the first discharge port 2721 with the first right injector 8R1. Further, the first right injector 8R1 is the right injector 8R first supplied with the fuel from the first discharge port 2721. The left connecting pipe 341L, for enabling fuel supply, connects the second discharge port 2722 with the first left injector 8L1. Further, the first left injector 8L1 is the left injector 8L first supplied with the fuel from the second discharge port 2722.

The right connecting pipe 341R and the left connecting pipe 341L are the same in length. That is, the first connecting pipe 341R which, for enabling fuel supply, connects the first discharge port 2721 with the plural first injectors 8R, and the second connecting pipe 341L which, for enabling fuel supply, connects the second discharge port 2722 with the plural second injectors 8L are the same in length.

Making the right connecting pipe 341R and the left connecting pipe 341L the same in length can reduce the difference in pressure fluctuation between the right and left cylinder rows 111R and 111L. That is, the fuel injection pressure and the fuel injection timing can be prevented from shifting between the right and left cylinder rows 111R and 111L. As a result, the difference in combustion performance between the right and left cylinder rows 111R and 111L can be suppressed. Further, the right connecting pipe 341R and the left connecting pipe 341L being the same in length may include not only the case where the two are completely the same in length, but also the case where the two are substantially the same in length. The difference in length to the extent that no difference in combustion performance occurs between the two may be included in the case where the lengths are substantially the same.

In the present embodiment, the first discharge port 2721 and the second discharge port 2722 are arranged in the front and back direction. In the configuration where the first and second discharge ports 2721 and 2722 are arranged in the front and back direction, both of the first and second discharge ports 2721 and 2722 can be placed in the center portion between the right and left cylinder rows 111R and 111L.

The first discharge port 2721 is placed more on one side in the front and back direction than the second discharge port 2722. The first injector 8R which is first supplied with the fuel from the first discharge port 2721 is placed more on the one side in the front and back direction than the second injector 8L which is first supplied with the fuel from the second discharge port 2722.

In detail, the first discharge port 2721 is placed behind the second discharge port 2722. The first right injector 8R1, which is first supplied with the fuel from the first discharge port 2721, is placed behind the first left injector 8L1, which is first supplied with the fuel from the second discharge port 2722 (see dashed line DL in FIG. 6). With the above configuration; when aligning the lengths of the right connecting pipe 341R and the left connecting pipe 341L, it is possible to prevent the lengths of both from becoming longer than necessary.

The right inter-injector pipe 342R connects the two right injectors 8R adjacent to each other in the front and back direction. In detail, the first right injector 8R1 and the second right injector 8R2 are connected by the right inter-injector pipe 342R. The second right injector 8R2 and the third right injector 8R3 are connected by the right inter-injector pipe 342R. The third right injector 8R3 and the fourth right injector 8R4 are connected by the right inter-injector pipe 342R. The fourth right injector 8R4 and the fifth right injector 8R5 are connected by the right inter-injector pipe 342R. The fifth right injector 8R5 and the sixth right injector 8R6 are connected by the right inter-injector pipe 342R.

As can be seen from the above, the engine 100 is provided with the inter-injector pipe 342R which, for enabling fuel supply, connects the plural first injectors 8R with each other. In detail, the engine 100 is provided with a plurality of inter-injector pipes 342R each of which, for enabling fuel supply, connects the two first injectors 8R adjacent to each other in the front and back direction. It is preferable that at least two of the plural inter-injector pipes 342R should be the same in shape. Further, the plural inter-injector pipes 342R referred to here are, in detail, the five right inter-injector pipes 342R.

In the present embodiment, all the five right inter-injector pipes 342R are the same in shape. Using the same shape for the plural right inter-injector pipes 342R can share component parts. As a result, manufacturing and management costs of the component parts can be reduced. The five right inter-injector pipes 342R are S-shaped in detail.

In the present embodiment, the left bank LB is the same in configuration as the right bank RB with respect to the configuration of the inter-injector pipe 342. That is, the left inter-injector pipe 342L connects the two left injectors 8L adjacent to each other in the front and back direction. In detail, the first left injector 8L1 and the second left injector 8L2 are connected by the left inter-injector pipe 342L. The second left injector 8L2 and the third left injector 8L3 are connected by the left inter-injector pipe 342L. The third left injector 8L3 and the fourth left injector 8L4 are connected by the left inter-injector pipe 342L. The fourth left injector 8L4 and the fifth left injector 8L5 are connected by the left inter-injector pipe 342L. The fifth left injector 8L5 and the sixth left injector 8L6 are connected by the left inter-injector pipe 342L.

As can be seen from the above, the engine 100 is provided with the five left inter-injector pipes 342L each of which, for enabling fuel supply, connects the two second injectors 8L adjacent to each other in the front and back direction. In the present embodiment, all the five left inter-injector pipes 342L are the same in shape. The five left inter-injector pipes 342L are S-shaped in detail. Further, the plural left inter-injector pipes 342L need not all be the same in shape. However, it is preferable that at least two of the plural left inter-injector pipes 342L are the same in shape.

In the present embodiment, the right inter-injector pipe 342R and the left inter-injector pipe 342L are the same in shape. That is, the right inter-injector pipe 342R and the left inter-injector pipe 342L are used as common component parts. The above configuration can easily equalize the total length of the five right inter-injector pipes 342R and the total length of the five left inter-injector pipes 342L. That is, the length of the right high-pressure fuel supply pipe 34R is easily the same as the length of the left high-pressure fuel supply pipe 34L.

The shape of the inter-injector pipe 342 may be other than S-shaped. It is preferable that the shape of the inter-injector pipe 342 should have a bend portion to absorb a manufacturing error.

The shape of the inter-injector pipe 342 may be other than S-shaped, such as J-shaped or U-shaped.

3. NOTES, ETC.

The various technical features disclosed in the present specification can be modified in various ways without departing from the gist of the technical creation thereof. That is, the above embodiments should be considered exemplary in all respects and not restrictive. Further, the plural embodiments and modified examples shown in the present specification may be combined to the extent possible.

In the above embodiments, the engine 100 is the V-type engine, but this is merely an exemplification. The present invention is applicable, for example, to a horizontally opposed engine in which the piston reciprocates in the horizontal direction.

REFERENCE SIGNS LIST

8: injector
8R: right injector (first injector)
8L: left injector (second injector)
11: cylinder
11R: right cylinder
11L: left cylinder
27: fuel pump
100: engine
111: cylinder row
111R: right cylinder row (first cylinder row)
111L: left cylinder row (second cylinder row)
341: connecting pipe
341R: right connecting pipe (first connecting pipe)
341L: left connecting pipe (second connecting pipe)
342: inter-injector pipe
342R: right inter-injector pipe
342L: left inter-injector pipe
2721: first discharge port
2722: second discharge port

The invention claimed is:

1. An engine comprising:

a first cylinder row having plural cylinders arranged in a front and back direction, the first cylinder row having a first length extending along the front and back direction from a first end of the first cylinder row to a second end of the first cylinder row;

a second cylinder row arranged parallel to the first cylinder row, the second cylinder row having a second length extending along the front and back direction from a first end of the second cylinder row to a second end of the second cylinder row;

plural first injectors provided for the respective cylinders of the first cylinder row, plural second injectors provided for respective cylinders of the second cylinder row; and a fuel pump having a first discharge port configured to discharge a fuel to the plural first injectors and a second discharge port configured to discharge a fuel to the plural second injectors, and wherein the entire fuel pump is positioned between the first cylinder row and the second cylinder row in a plan view from an up and down direction, between the first and second ends of the first cylinder row, and between the first and second ends of the second cylinder row.

2. The engine as claimed in claim 1, wherein:

the fuel discharged from the first discharge port to the plural first injectors arranged in the front and back direction is sequentially supplied to the plural first injectors, from the first injectors' first injector positioned at one end in the front and back direction to the first injectors' first injector positioned at another end in the front and back direction, according to a sequence of arrangement of the plural first injectors in the front and back direction, and the fuel discharged from the second discharge port to the plural second injectors arranged in the front and back direction is sequentially supplied to the plural second injectors, from the second injectors' second injector positioned at one end in the front and back direction to the second injectors' second injector positioned at another end in the front and back direction, according to a sequence of arrangement of the plural second injectors in the front and back direction.

3. The engine as claimed in claim 2, wherein:

a first connecting pipe which, for enabling fuel supply, connects the first discharge port with the plural first injectors, a second connecting pipe which, for enabling fuel supply, connects the second discharge port with the plural second injectors, and the first and second connecting pipes are the same in length.

4. The engine as claimed in claim 1, comprising:

an inter-injector pipe which, for enabling fuel supply, connects the plural first injectors with each other, and wherein at least two of the plural inter-injector pipes are the same in shape.

5. The engine as claimed in claim 1, wherein the first discharge port and the second discharge port are arranged in the front and back direction.

6. The engine as claimed in claim 1, wherein:

the first discharge port is placed more on one side in the front and back direction than the second discharge port, and the first injector which is first supplied with the fuel from the first discharge port is placed more on the one side in the front and back direction than the second injector which is first supplied with the fuel from the second discharge port.

7. The engine as claimed in claim 1, wherein:

the plural first injectors and the plural second injectors each include a third end opposite a fourth end, and the fuel pump is positioned at the respective first ends of the first and second cylinder rows and the respective third ends of the plural first and second injectors.

8. The engine as claimed in claim 7, wherein the first and third ends are positioned at a rear of the engine.

9. The engine as claimed in claim 1, wherein:

the plural first injectors and the plural second injectors each include a third end opposite a fourth end, and the first discharge port and the second discharge port are positioned at the respective first ends of the first and second cylinder rows and the respective third ends of the plural first and second injectors.

10. The engine as claimed in claim 1, wherein:

a vertical plane extends through the first cylinder row and the second cylinder row and between the first discharge port and the second discharge port; and a horizontal plane extends through each cylinder of the first cylinder row and each cylinder of the second cylinder row.

11. The engine as claimed in claim 1, wherein:

a vertical plane that is equidistant from each of the first cylinder row and the second cylinder row passes through each of the first and second discharge ports; and the fuel pump is interposed between a first injector of the plural first injectors and a second injector of the plural second injectors.

12. The engine as claimed in claim 1, wherein:

each cylinder of the first cylinder row is adjacent another cylinder of the first cylinder row along the front and back direction, and a plane that bisects the engine between the first cylinder row and the second cylinder row includes the up and down direction, wherein the up and down direction is perpendicular to the front and back direction.

13. An engine comprising:

a first cylinder row comprising a first plurality of cylinders arranged in a first direction;

a second cylinder row comprising a second plurality of cylinders, the second cylinder row arranged parallel to the first direction;

a first plurality of injectors in fluid communication with the first plurality of cylinders;

a second plurality of injectors in fluid communication with the second plurality of cylinders; and a fuel pump including a first port and a second port, the first port in fluid communication with a first injector of the first plurality of injectors, and the second port in fluid communication with a second injector of the second plurality of injectors, wherein the fuel pump is positioned between the first cylinder row and the second cylinder row such that a plane perpendicular to the first direction extends through each of the first cylinder row, the fuel pump, and the second cylinder row and between the first discharge port and the second discharge port.

14. The engine as claimed in claim 13, wherein:

the first plurality of injectors includes a first end and a second end, and the first injector is positioned at the first end or the second end, the engine configured such that fuel discharged from the first port is sequentially supplied to each injector of the first plurality of injectors starting with the first injector.

15. The engine as claimed in claim 14, wherein:

a first pipe connects the first port with the first injector, a second pipe connects the second port with the second injector, and the first and second pipes have equal lengths.

16. The engine as claimed in claim 13, comprising:

a plurality of pipes, wherein each pipe of the plurality of pipes connects two adjacent injectors of the first plurality of injectors, and wherein at least two pipes of the plurality of pipes have the same shape.

17. The engine as claimed in claim 13, wherein:

a second plane perpendicular to the first direction extends through the first injector and the fuel pump, and the second injector is offset from the second plane.

18. The engine as claimed in claim 13, wherein:

the first cylinder row and the second cylinder row each include a first end opposite a second end, the plural first injectors and the plural second injectors each include a third end opposite a fourth end, and the fuel pump is positioned at the first and third ends.

19. The engine as claimed in claim 13, wherein:

the first cylinder row and the second cylinder row each include a first end opposite a second end, the plural first injectors and the plural second injectors each include a third end opposite a fourth end, and wherein the first discharge port and the second discharge port are positioned at the first and third ends, respectively.

20. The engine as claimed in claim 13, wherein a second plane that is equidistant from each of the first cylinder row and the second cylinder row passes through each of the first and second discharge ports.

* * * * *